Figure 1:
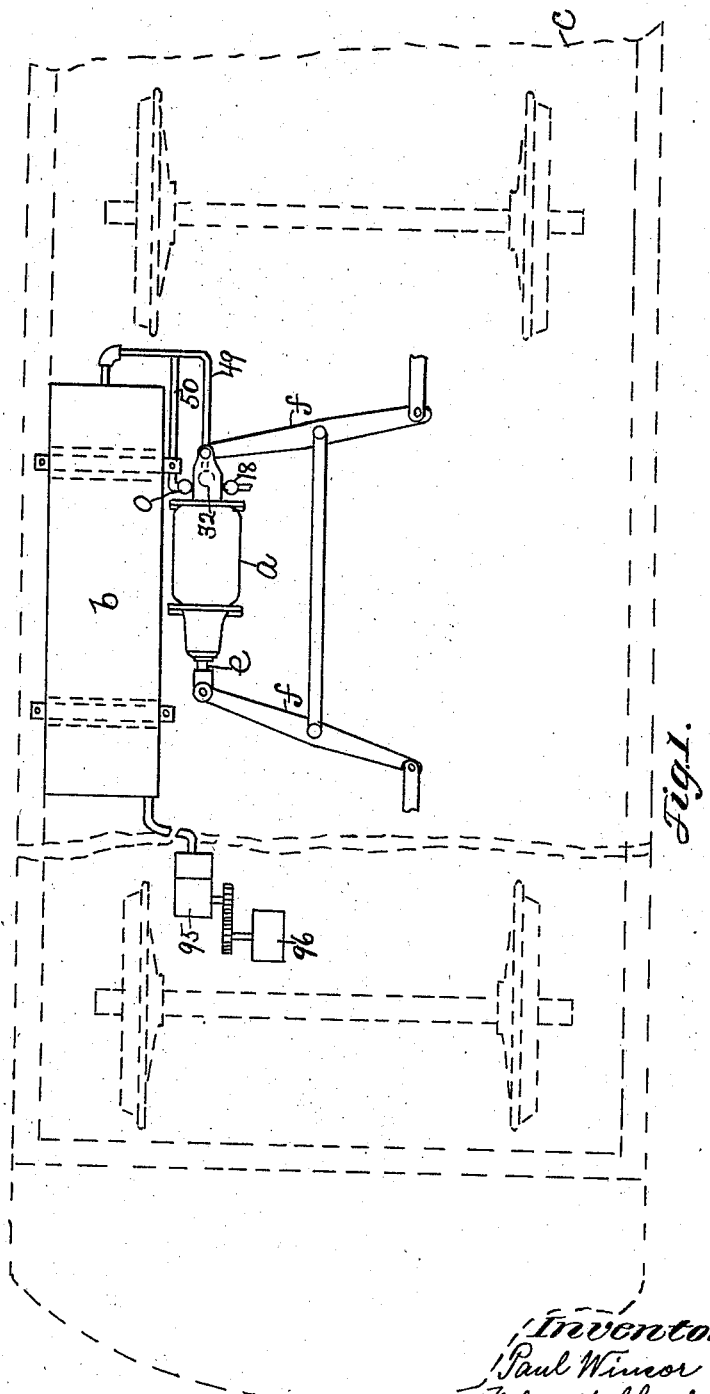

No. 814,999. PATENTED MAR. 13, 1906.
P. WINSOR.
SYSTEM OF AUTOMATIC BRAKES.
APPLICATION FILED MAR. 23, 1905.

3 SHEETS—SHEET 1.

No. 814,999. PATENTED MAR. 13, 1906.
P. WINSOR.
SYSTEM OF AUTOMATIC BRAKES.
APPLICATION FILED MAR. 23, 1905.

3 SHEETS—SHEET 2.

Witnesses. Inventor
Paul Winsor
by Jas. H. Churchill
Atty.

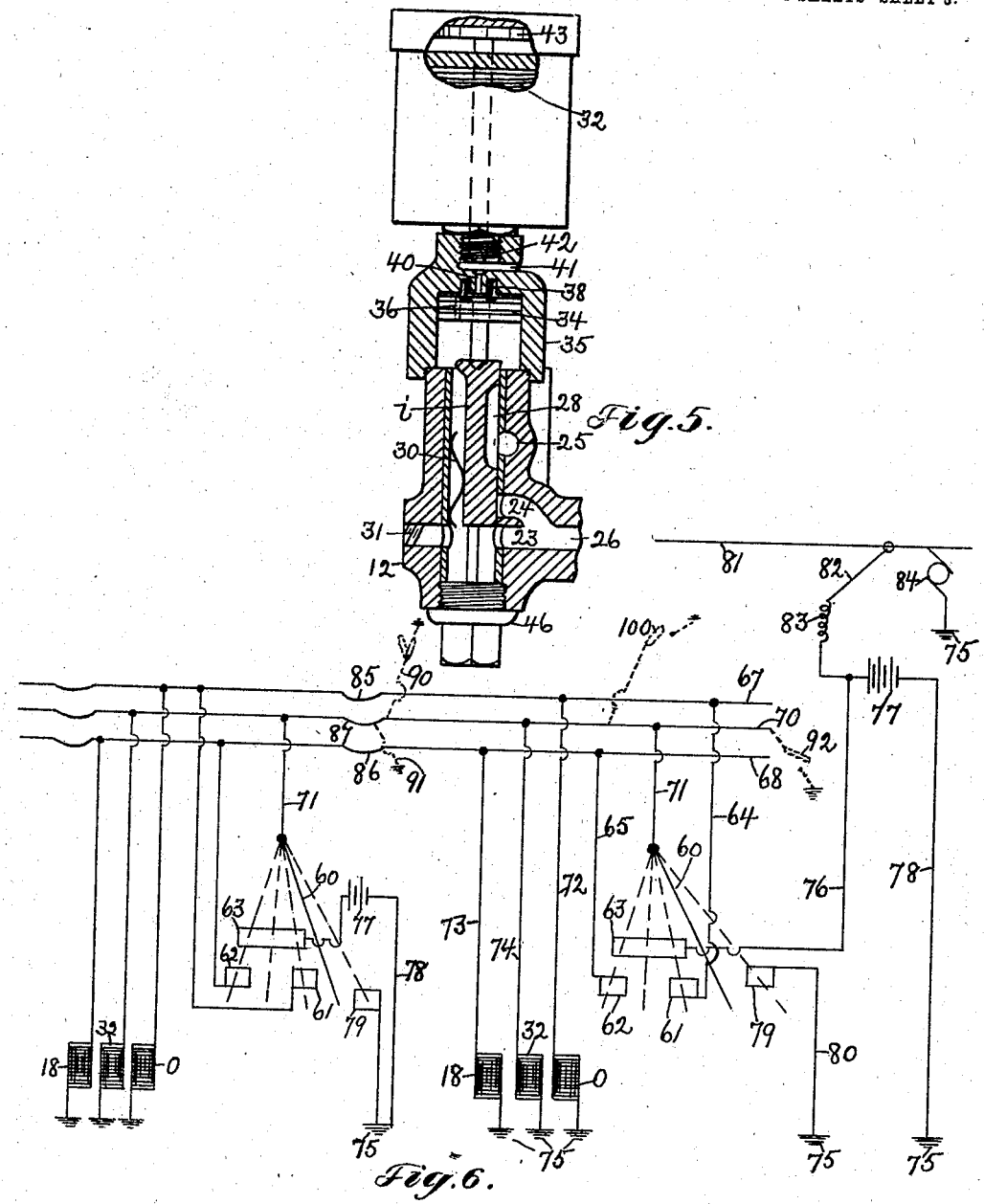

UNITED STATES PATENT OFFICE.

PAUL WINSOR, OF WESTON, MASSACHUSETTS, ASSIGNOR TO WESTINGHOUSE AIR BRAKE COMPANY, OF PITTSBURG, PENNSYLVANIA, A CORPORATION.

SYSTEM OF AUTOMATIC BRAKES.

No. 814,999.      Specification of Letters Patent.      Patented March 13, 1906.

Application filed March 23, 1905. Serial No. 251,658.

*To all whom it may concern:*

Be it known that I, PAUL WINSOR, a citizen of the United States, residing in Weston, in the county of Middlesex and State of Massachusetts, have invented an Improvement in Systems of Automatic Brakes, of which the following description, in connection with the accompanying drawings, is a specification, like characters on the drawings representing like parts.

This invention relates to a system of automatic brakes, especially of that class in which a fluid under pressure, such as air, is employed to apply the brakes, and has for its object to provide a system whereby the application and release of the brakes are electrically controlled, as will be described.

Provision is made for electrically controlling the application of the brakes under ordinary conditions of use and also in cases of emergency.

The invention is adapted for use on single cars, such as electrically-propelled cars, or on a plurality of cars coupled together to form a train, and provision is made for manually controlling the operation of the brakes on each or any car of the train and also for automatically operating the brakes in case the train breaks apart.

In accordance with this invention the application of the brakes under ordinary conditions is governed by an electrically-controlled valve, which may be termed the "service-valve," and the release is governed by an electrically-controlled valve, termed the "release-valve," and the application of the brakes in case of emergency is governed by an electrically-controlled valve, termed the "emergency-valve."

The emergency-valve is constructed so as to effect the application of the brakes substantially in an instant, and I prefer to have said emergency-valve coöperate with the other valves, as will be described, so that said emergency-valve governs the effect upon the brakes of the operation of the service and release valves, whereby when said emergency-valve is in one position the service-valve may be operated to effect the application of the brakes and the release-valve may be operated to release the brakes, and when in another position said release-valve and preferably also the service-valve, is rendered non-effective upon said brakes, thereby rendering the application of the brakes by the operation of the emergency-valve independent of the condition of the release-valve.

The translating devices or magnets which govern the operation of the aforesaid valves are connected in circuit with a controller located in each car, and the circuit in each car may be connected with the circuits of adjacent cars of a train, whereby the translating devices on all the cars may be governed by a controller on any car, as will be described.

These and other features of this invention will be pointed out in the claims at the end of this specification.

Figure 2:
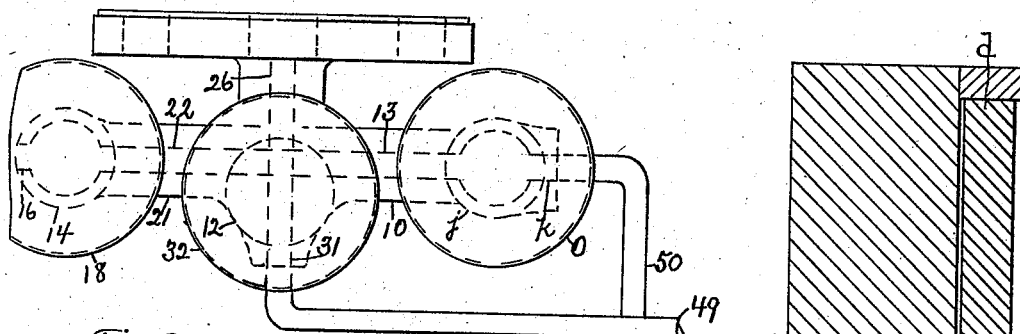
Figures 3, 4:
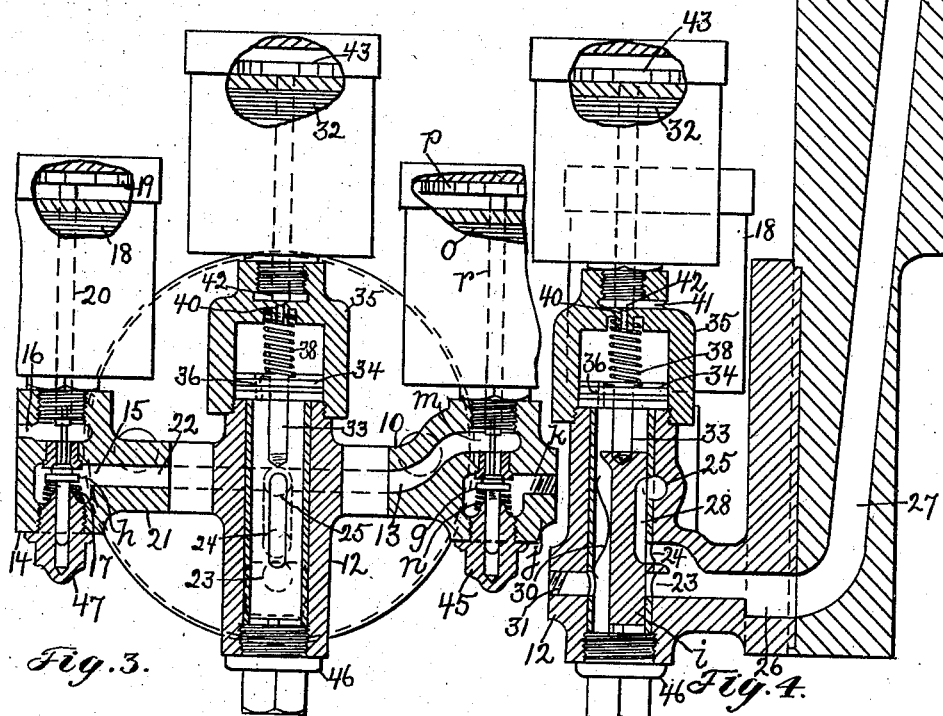

Figure 1 is a plan view of a sufficient portion of a car provided with a braking system embodying this invention; Fig. 2, a detail in plan of the electrically-operated valves shown in Fig. 1; Fig. 3, a section and elevation of the electrically-operated valves; Fig. 4, a detail in vertical section through the brake-cylinder and emergency-valve; Fig. 5, a detail in section, showing the emergency-valve in its open position; and Fig. 6, a diagram of circuits to be referred to.

Referring to the drawings, $a$ represents a brake-cylinder, and $b$ a reservoir containing air or other fluid under pressure and carried by the car $c$, which latter may be of any suitable or desired construction. The brake-cylinder $a$ is provided with the usual piston $d$, having its piston-rod $e$ connected to the usual levers $f$, which are and may be operatively connected in the usual manner to the brakes. (Not herein shown.) The piston $d$ is moved in one direction to apply the brakes by fluid under pressure, preferably air admitted into its cylinder, and is moved in the opposite direction in the usual manner by a spring located in the brake-cylinder $a$ and not herein shown.

The present invention relates, primarily, to controlling the admission and release of the air into and from the brake-cylinder, and for this purpose I employ a service-valve $g$, a release $h$, and an emergency-valve $i$. (Shown best in Figs. 3 and 4.) The service-valve $g$ is located in a valve-casing $j$, provided with an inlet-port $k$ and an outlet-port $m$, communication between said ports being controlled by the valve $g$, which in the present instance is seated by a spring $n$ and is opened by the energizing of an electromagnet $o$ of any suitable construction, the armature $p$ of which is connected to the stem $r$ of the valve $g$, so that when the magnet $o$ is energized the valve $g$ is opened. The valve-casing $j$ in the present instance forms part of an arm 10, extended from a valve-casing 12 and having a passage 13, which communicates with the outlet-port $m$ of the valve-casing $j$.

The release-valve $h$ is of similar construction as the service-valve $g$ and is located in a casing 14, provided with an inlet-port 15 and with an outlet 16, which latter communicates with the atmosphere. The release-valve $h$ is seated by a spring 17 and is opened by an electromagnet 18, to whose armature 19 is connected the stem 20 of the release-valve.

The valve-casing 14 forms part of an arm 21, extended from the valve-casing 12 and provided with a passage 22. The valve-casing 12 contains the emergency-valve $i$, which is shown in the present instance as a slide or D valve, which coöperates with the ports 23 24 25, the ports 23 24 communicating, through the passages 26 27, with the brake-cylinder, and the port 25, which constitutes an inlet-port, communicates with the passages 13 22 in the arms 10 21 and is adapted to be connected by the recess 28 of the valve $i$ with the port 24. The emergency-valve $i$ is shown as held to its seat by a spring 30. The emergency-valve casing 12 is provided with a second inlet-port 31, which is directly connected with the source of pressure, which in the present instance is the reservoir $b$. The emergency-valve $i$ is electrically controlled and may be operated directly by an electromagnet 32; but I may prefer to have it indirectly operated by said magnet, as will now be described. For this purpose the valve $i$ has its stem 33 connected to a piston 34, movable in a cylinder 35, attached to the valve-casing 12 and provided with means for permitting pressure to pass from the front to the rear of said piston, which may be effected, as herein represented, by one or more vent-passages 36 through said piston. (See Fig. 4.) The piston 34 has coöperating with it a spring 38, which acts to move the piston so as to bring the emergency-valve $i$ into the position shown in Fig. 4, which may be considered as its normal or closed position. The cylinder 35 is provided at its upper or rear end with a port or passage 40, which connects with a lateral passage 41, communicating with the atmosphere. The port or passage 40 has coöperating with it a valve 42, which is connected with the armature 43 of the electromagnet 32, which when energized seats the valve 42, as shown in Figs. 3 and 4, and cuts off communication between the cylinder 35 and the atmosphere. The spring 38 is of sufficient strength to move the piston 34 to one end of its cylinder when the pressures on opposite sides of the said piston are substantially equal, but yields when the pressure behind the piston is materially less than that in front of the piston, which is the condition when the valve 42 is open, as shown in Fig. 5.

The valve-casings $j$, 12, and 14 may be provided, as shown in Fig. 3, with removable caps or nuts 45 46 47. The inlet-port $k$ of the service-valve casing $j$ and the inlet-port 31 of the emergency-valve casing 12 are connected with the source of pressure, and, as herein represented, the inlet-port 31 is connected by the pipe 49 with the reservoir $b$, and the inlet-port $k$ is connected by the branch pipe 50 with the pipe 49.

The operation of the apparatus as thus far described may be briefly set forth as follows: Assume the parts in the position represented in Figs. 1, 3, and 4, which is the position they may occupy after the brakes have been released. In this condition it will be noticed that the service and release valves $g$ $h$ are closed and the emergency-valve $i$ is in what may be termed its "closed" or "normal" position—that is, the inlet-port 31 is cut off from the brake-cylinder, which latter, however, is in communication with the inlet-port 25 through the port 24 and recess 28 in the emergency-valve. Assume that it is desired to apply the brakes in the ordinary service of the car. In this case the circuit of the service-magnet $o$ is closed, and the energizing of said magnet opens the service-valve $g$, thereby connecting the brake-cylinder with the reservoir $b$ and admitting pressure into the brake-cylinder, which pressure moves the piston $d$ and applies the brakes. The pressure passes from the reservoir $b$ through the pipes 49 50 to the inlet-port $k$ of the valve-casing $j$, thence past the valve $g$ into the outlet-port $m$ of said casing, thence through the passage 13 to port 25, thence through the recess 28 in the emergency-valve $i$ to the port 24, and thence through the passages 26 27 into the brake-cylinder. After the car has stopped the circuit of the service-magnet $o$ may be opened and the service-valve is closed by its spring $n$. To release the brakes, the circuit of the release-magnet 18 is closed, and the said magnet is thereby energized, which attracts its armature and opens the release-valve $h$. The pressure in the brake-cylinder $d$ then passes out therefrom through the passages 27 26, port 24, recess 28 in valve $i$, through the port 25, passage 22, inlet-port 15 of release-valve, past the valve $h$, and through the outlet-port 16 to the atmosphere.

Assume that an emergency arises and that it is desired to apply the brakes substantially in an instant. In this case the circuit of the magnet 32 is opened, the said magnet deënergized, and the valve $i$ opened, thereby connecting the cylinder 35 with the atmosphere and unbalancing the piston 34, which is moved by the air-pressure on its front face to the opposite end of the cylinder. The piston 34 in its movement just described moves the emergency-valve $i$ so as to cut off the inlet-port 25 from the brake-cylinder and connect the inlet-port 31 with said cylinder, and this position of the emergency-valve is represented in Fig. 5. In this case the pressure passes from the reservoir $b$ through the pipe 49, ports 31 23, and passages 26 27 directly into the brake-cylinder, thereby moving the piston $d$ to apply the brakes.

When the emergency-valve is in its opened position just described, the brake-cylinder $a$ is cut off from the release-valve $h$, so that the application of the brakes by the operation of the emergency-valve is entirely independent of the condition or position of the release-valve, thereby insuring the application of the brakes, even though the release-valve should be in its opened position.

When it is desired to release the brakes after an emergency application, the circuit of the magnet 32 is closed, which energizes the said magnet and closes the valve 42. As soon as the valve 42 is closed the pressure in front of the piston 34 passing into the cylinder through the vent-port 36 diminishes the effective pressure on the front side of the piston, thereby permitting the spring 38 to move said piston and the emergency-valve into the position shown in Fig. 4, thereby cutting off direct communication between the brake-cylinder and the source of pressure and connecting said brake-cylinder with the passages 13 22, so that by energizing the release-magnet $h$ the brake-cylinder can be connected to the atmosphere to release the brakes. The brakes may be gradually released by energizing and deënergizing the release-magnet. In practice it may be desirable to make the emergency inlet-port 31 larger than the port of the service-valve $k$, so that in cases of emergency the brakes may be applied substantially in an instant and in a shorter time than when applied in the regular service.

The electromagnets $o$, 18, and 32 may be governed by a suitable circuit controller or controllers on each car, which controller may govern not only the magnets on its own car, but also the magnets of all the cars which may be connected together to form a train.

In the present instance I have represented in diagram one arrangement of circuits and circuit-controller for governing all of the magnets on each car from its own car and for governing the magnets of all the cars from a single car, such as the operating-car of an electrically-operated train of cars; but I do not desire to limit my invention to the particular arrangement shown.

In Fig. 6 I have represented the electromagnets of two cars and the circuit-controllers for said cars, and inasmuch as said circuit-controllers are of like construction I will specifically describe but one. The circuit-controller herein shown consists of a movable blade or contact member 60, which coöperates with a plurality of stationary contacts or terminals 61 62 63, which may be designated the service, release, and battery terminals or contacts. The battery-terminal 63 is made longer than the release and service terminals, so that the movable member 60 may remain in engagement with said battery-terminal when engaged with either the service or release terminals and while moving from one to the other. The terminals 61 62 are connected by wires 64 65 with conductors or wires 67 68, extended through the car and which may be designated the service and release train lines or wires. A third train-line wire 70 is provided, to which the movable member or switch 60 is connected by the wire 71. The electromagnets $o$, 18, and 32 are connected to the train-lines 67 68 70 by wires 72 73 74 and are also connected to the ground 75. The battery-terminal 63 is connected by wire 76 with the positive pole of a battery 77, the negative pole of which is connected with the ground 75 by wire 78. The circuit-controller is provided with an additional terminal 79, which is connected by wire 80 to the ground 75. The battery 77 may be of any suitable construction, such as a storage battery, which may be charged from the trolley-wire or third rail 81 of an electrically-operated road through the trolley-pole 82 and resistance 83, the trolley-wire being supplied with current from a generator 84 in the usual manner. The train-lines 67 68 70 on one car of the train are connected to corresponding train-lines of the next car by coupling-conductors, (represented by the curved lines 85 86 87,) which, it will be understood, are in practice assembled in a single cable and provided with proper means for automatic disconnection from the train-lines in case of accidental parting of the train.

In Fig. 6 I have represented the switch 60 in five different positions, one by full lines and the other four by dotted lines. The full-line position represents the normal or emergency position and the other four positions the service, lap, release, and ground positions. By reference to Fig. 6 it will be seen that when the switch 60 is in contact with either the service or release terminal it is also in engagement with the battery-terminal. In order that the invention may be clearly comprehended, let it be assumed that the switches 60 of all the cars in the train except the operating-switch are in their normal or full-line position and that the switch of the operating-car is in engagement with the battery-terminal only. In this position of the switch 60 of the operating-car the circuit of the emergency-magnets in all the cars is completed. This circuit may be traced as follows—viz., from the positive pole of the battery 77 by wire 76 to terminal 63, thence by switch 60 and wire 71 to emergency train-line, thence by the wires 74 and emergency-magnets 32 to the ground 75, thence by wire 78 to negative pole of battery 77. Assume that the motorman desires to apply the brakes—as, for instance, when approaching a station. In this case the switch 60 on the operating-car is moved so as to make contact with the service-terminal 61, whereupon the circuits of all the service-magnets o of the train are energized. This circuit may be traced as follows: from the positive pole of the battery 77 by wire 76 to terminal 63, where the current divides, a part passing through the emergency-magnets, as above described, and a part passing to the service train-line 67 by switch 60, terminal 61, and wire 64. From the service train-line 67 the current passes by wires 72 and all of the service-magnets o to the ground, thence back to the battery by the wire 78. To release the brakes, the motorman moves the switch 60 onto the release-terminal 62, which completes the circuit through all of the release-magnets. This circuit may be traced as follows: from the battery 77 by wire 76 to terminal 63, where the current divides, a part passing through the emergency-magnets, as above described, and a part passing to the release train-line 68 by switch 60, terminal 62, and wire 65. From the train-line 68 the current passes by wire 73 and release-magnets 18 to the ground and thence back to battery 77 by wire 78.

To apply the brakes in case of emergency, the motorman moves his switch 60 into the full-line position, thereby disconnecting the train-lines from the battery 77 and deënergizing the emergency-magnets 32, with the results above set forth.

Provision is made for insuring the operation of the emergency-magnets irrespective of the position of the switches in the cars other than the operating-car, whereby the carelessness of employees is guarded against. For this purpose the circuit-controller is provided with the terminal 79, which is connected with the ground. Let it be assumed that the switch 60 of the second car has been left by an oversight in engagement with the battery-terminal 63 of said car. In this case the circuit of the emergency-magnet of the second car would be completed from the battery in said second car, and said magnet would remain energized when the switch 60 of the operating-car was moved into the normal or emergency position, and the brakes would not be applied. By throwing the switch 60 in the operating-car onto the grounded terminal 79 the emergency-magnets are short-circuited and deënergized, thereby causing the brakes to be applied. This short circuit may be traced as follows: from one terminal of the magnet 32 by wire 74 to train-wire 70, thence by wire 71 on operating-car to switch 60, to terminal 79 and wire 80 to ground 75, thence to the opposite terminal of the magnet 32. The curved lines 85 86 87 in Fig. 6 represent the couplers or flexible connections between the train-wires of the cars, and suitable provision is made for grounding the emergency-wire of both portions of the train. In Fig. 6 I have represented the connections as they would be if the coupler pulled away from the forward car. In this case the wire 70 is grounded, as shown by the dotted line 90, and the coupling-cable, and therefore the train-wire 70 on the rear car, is grounded as shown by the dotted line 91. The same provision is made for the case where the coupler pulls out of the rear car. Provision is also made by means of switches 92 at the opposite ends of each car to remove the ground at the ends of the train of one or more cars.

I have herein shown one system of circuits and one construction of circuit-controller which I may prefer; but I do not desire to limit my invention in this respect, as other arrangements of circuits and constructions of circuit-controller may be employed In practice each car is provided with its own source of braking power—to wit, the reservoir b, which may be supplied with air by a pump 95, (see Fig. 1,) driven by an electric motor 96, carried by the car; but I do not desire to limit my invention in this respect, as the reservoir b may be supplied from any other suitable source of pressure—as, for instance, a reservoir on the operating-car may be connected by a train-line pipe with the reservoir b of the different cars.

The invention has been described in connection with an electrically-propelled car; but it is equally well adapted for use on roads operated by steam or other power.

Provision can be made at any point of the train by which the emergency-valves may be short-circuited either manually or by automatic devices, such as a tripping device. In Fig. 6 such devices are represented by the switch 100, which is adapted to connect the emergency train-wire 70 with the ground.

I claim—

1. In a braking system of the class described, in combination, a car, a reservoir containing fluid under pressure, a brake-cylinder carried by said car and connected with said reservoir, a valve controlling the admission of pressure from said reservoir into said brake-cylinder, a valve controlling the exhaust from said brake-cylinder, an emergency-valve controlling the admission of pressure into said brake-cylinder independently of the said admission-valve, electromagnets controlling the operation of said valves, and means for controlling the operation of said electromagnets, substantially as described.

2. In a braking system of the class described, in combination, a brake-cylinder, an admission-valve controlling the admission of pressure into said cylinder, a release-valve controlling the exhaust from said cylinder, an emergency-valve controlling the admission of pressure into said cylinder independently of said admission-valve, electromagnets controlling the operation of said valves, and means to control said electromagnets, substantially as described.

3. In a braking system of the class described, in combination, a brake-cylinder, a valve-chest connected with said brake-cylinder, a source of pressure connected with said valve-chest, a piston connected with said valve, a cylinder in which said piston reciprocates provided with an exhaust port or opening and in communication with said valve-chest to substantially balance said piston when said exhaust-port is closed, means rendered effective to move said piston in one direction when the pressures on opposite sides of said piston are substantially equal, a valve controlling the exhaust-port of said cylinder, an electromagnet to operate said valve, and means to control the operation of said electromagnet.

4. In a braking system of the class described, in combination, a brake-cylinder provided with a port or passage, a valve-casing provided with an inlet-port and with an outlet-port, the latter communicating with the passage in said brake-cylinder, independent valve-casings provided with inlet and outlet ports, the inlet-port of one valve-casing and the outlet-port of the other valve-casing being connected with the valve-casing connected with said brake-cylinder, valves in said independent valve-casings, electromagnets for controlling the operation of said valves, and means to control said electromagnets, substantially as described.

5. In a braking system of the class described, in combination, a brake-cylinder provided with a fluid-inlet port, a valve-casing provided with a fluid-outlet port communicating with the fluid-inlet port of said brake-cylinder, and having a fluid-inlet port connected with the source of fluid-pressure, said source of fluid-pressure, a second valve-casing provided with an inlet-port connected with the source of fluid-pressure and having an outlet-port connected with the first-mentioned valve-casing, a valve in said second-mentioned casing controlling the passage of fluid through it, a valve in said first-mentioned casing controlling the passage of fluid from the second-mentioned casing to said brake-cylinder, a third valve-casing having an inlet-port connected with said first-mentioned valve-casing and provided with an outlet-port, a valve controlling the passage through said third-mentioned casing, electromagnets controlling the operation of said valves, and means for controlling the operation of said electromagnets.

6. In a braking system of the class described, in combination, a brake-cylinder provided with a fluid-inlet port, a valve-casing provided with a fluid-outlet port communicating with the fluid-inlet port of said brake-cylinder, and having a fluid-inlet port connected with the source of fluid-pressure, said source of fluid-pressure, a second valve-casing provided with an inlet-port connected with the source of fluid-pressure and having an outlet-port connected with the first-mentioned valve-casing, a valve in said second-mentioned casing controlling the passage of fluid through it, a valve in said first-mentioned casing controlling the passage of fluid from the second-mentioned casing to said brake-cylinder, a third valve-casing having an inlet-port connected with said first-mentioned valve-casing and provided with an outlet-port, a valve controlling the passage through said third-mentioned casing, and means to operate said valves, substantially as described.

7. In a braking system of the class described, in combination, a brake-cylinder, an admission-valve controlling the admission of pressure into said cylinder, a release-valve controlling the exhaust from said cylinder, an emergency-valve controlling the passage of fluid from said admission-valve into said brake-cylinder and the exhaust from said brake-cylinder to the release-valve, and controlling also the admission of fluid into said brake-cylinder independently of said admission-valve, electromagnets governing the operation of said valves, and means for controlling the operation of said electromagnets, substantially as described.

8. In a braking system of the class described, in combination, a brake-cylinder, a valve-casing provided with an outlet-port communicating with said brake-cylinder and having two independent inlet-ports, a valve in said casing connecting one of said inlet-ports with said outlet-port and disconnecting the other of said inlet-ports from said outlet-port when the valve is in one position, and disconnecting the first-mentioned inlet-port from and connecting the second inlet-port with said outlet-port when the valve is in another position, an electromagnet governing the operation of said valve, and means to control said electromagnet, substantially as described.

9. In a braking system of the class described, in combination, a brake-cylinder, a valve-casing provided with an outlet-port communicating with said brake-cylinder and having two independent inlet-ports, a valve in said casing connecting one of said inlet-ports with said outlet-port and disconnecting the other of said inlet-ports from said outlet-port when the valve is in one position, and disconnecting the first-mentioned inlet-port from and connecting the second inlet-port with said outlet-port when the valve is in another position, a valve-casing provided with an outlet-port communicating with the atmosphere, and having an inlet-port communicating with an inlet-port of the first-mentioned valve-casing, a valve in said second casing, electromagnets governing the operation of said valves, and means to control said electromagnets.

10. In a braking system of the class described, in combination, a brake-cylinder, an electrically-operated fluid-admission valve for said cylinder, an electrically-operated release-valve for said cylinder, an electrically-operated emergency-valve governing the communication of said admission and release valves with said brake-cylinder and also governing the admission of fluid into said brake-cylinder independently of said admission-valve, and means to control the operation of said valves, substantially as described.

11. In a braking system of the class described, in combination, a brake-cylinder, an admission-valve controlling the admission of pressure into said cylinder, a release-valve controlling the exhaust from said cylinder, an emergency-valve controlling the admission of pressure into said cylinder, electromagnets for operating said valves, an electric circuit for each of said valves comprising service, release and emergency train-line wires to which the admission, release and emergency magnets are connected, a circuit-controller comprising a movable member connected with the emergency train-line wire, contact-terminals connected with said service and release train-line wires, a battery-terminal, and a ground-terminal, substantially as described.

12. In a braking system of the class described, in combination, a brake-cylinder, an admission-valve for said brake-cylinder, an exhaust or release valve for said cylinder, and an electrically-operated valve interposed between said admission and release valves and said cylinder and governing the communication between said valves and said brake-cylinder, substantially as described.

13. In a braking system of the class described, in combination, a brake-cylinder, a valve controlling the supply of pressure to said brake-cylinder, and an electrically-controlled valve interposed between said supply-valve and said brake-cylinder and in one position placing the admission of fluid-pressure into said brake-cylinder under the control of the first-mentioned valve and in another position effecting the admission of fluid-pressure into said brake-cylinder independent of the said first-mentioned valve, substantially as described.

14. In a braking system of the class described, in combination, a brake-cylinder, a valve controlling communication with said brake-cylinder, and an electrically-controlled valve interposed between the first-mentioned valve and the said brake-cylinder and in one position placing communication with said brake-cylinder under control of the first-mentioned valve and in another position taking the control of said communication from the first-mentioned valve and effecting the admission of pressure into said brake-cylinder, substantially as described.

15. In a braking system of the class described, in combination, a brake-cylinder, a release-valve controlling the exhaust from said cylinder, an emergency-valve controlling the exhaust from the brake-cylinder to the release-valve and controlling also the admission of fluid into said brake-cylinder, electromagnets governing the operation of said valves, and means for controlling the operation of said electromagnets.

16. In a braking system of the class described, in combination, a source of fluid-pressure, a brake-cylinder, a valve-casing connected with the source of supply and with said brake-cylinder, a valve in said casing controlling the connection of the source of supply with said brake-cylinder, a release-valve communicating with said brake-cylinder through said valve-casing and controlled by the valve in said casing, an electromagnet governing the operation of the valve in said casing, and means for operating said electromagnet, substantially as described.

17. In a braking system of the class described, in combination, a brake-cylinder, a valve controlling communication with said brake-cylinder, an electromagnet controlling the operation of said valve, an electric circuit in which said magnet is included, a source of current included in said electric circuit, a circuit-controller coöperating with said circuit to govern the operation of said electromagnet, and means coöperating with said electric circuit to short-circuit said electromagnet and thereby prevent its operation, substantially as described.

18. In a braking system of the class described, in combination, a train-line, a plurality of electromagnets connected with said train-line, a circuit-controller connected with said train-line and governing the operation of said electromagnets, a plurality of brake-cylinders, a plurality of valves controlling communication with said brake-cylinders, and means coöperating with said electric circuit to short-circuit said electromagnets and prevent their operation, substantially as described.

In testimony whereof I have signed my name to this specification in the presence of two subscribing witnesses.

PAUL WINSOR.

Witnesses:
 JAS. H. CHURCHILL,
 J. MURPHY.